(12) United States Patent
Nagase

(10) Patent No.: US 12,511,085 B2
(45) Date of Patent: Dec. 30, 2025

(54) PORTABLE TERMINAL DEVICE, NON-TRANSITORY COMPUTER READABLE MEDIUM STORING PROGRAM, AND METHOD FOR PROVIDING SERVICE UPON AUTHENTICATED ENTRY

(71) Applicant: FUJIFILM Business Innovation Corp., Tokyo (JP)

(72) Inventor: Sho Nagase, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 385 days.

(21) Appl. No.: 17/948,234

(22) Filed: Sep. 20, 2022

(65) Prior Publication Data
US 2023/0305771 A1 Sep. 28, 2023

(30) Foreign Application Priority Data
Mar. 24, 2022 (JP) .................................. 2022-048557

(51) Int. Cl.
*G06F 3/12* (2006.01)
*G07C 9/27* (2020.01)

(52) U.S. Cl.
CPC .......... *G06F 3/1238* (2013.01); *G06F 3/1204* (2013.01); *G06F 3/1207* (2013.01); *G06F 3/1222* (2013.01); *G06F 3/1253* (2013.01); *G06F 3/126* (2013.01); *G06F 3/1293* (2013.01); *G07C 9/27* (2020.01)

(58) Field of Classification Search
None
See application file for complete search history.

(56) References Cited

U.S. PATENT DOCUMENTS

| | | | |
|---|---|---|---|
| 2002/0044299 A1* | 4/2002 | Iwase | H04L 9/40 358/1.15 |
| 2009/0036056 A1* | 2/2009 | Oshima | H04M 1/72412 455/41.3 |
| 2019/0139017 A1 | 5/2019 | Malinofsky et al. | |

FOREIGN PATENT DOCUMENTS

| | | |
|---|---|---|
| JP | 2006031545 | 2/2006 |
| JP | 2021503108 | 2/2021 |

OTHER PUBLICATIONS

"Notice of Reasons for Refusal of Japan Counterpart Application", issued on Nov. 4, 2025, with English translation thereof, p. 1-p. 3.

* cited by examiner

*Primary Examiner* — Thomas D Lee
(74) *Attorney, Agent, or Firm* — JCIPRNET

(57) ABSTRACT

A portable terminal device includes a processor configured to, in receiving a notification indicating that a user has entered a region in which authentication of the user is necessary at a time of entry, notify, in a case where a selection related to a service provided in the region is made in advance, a system providing the service of a content of the selection.

14 Claims, 8 Drawing Sheets

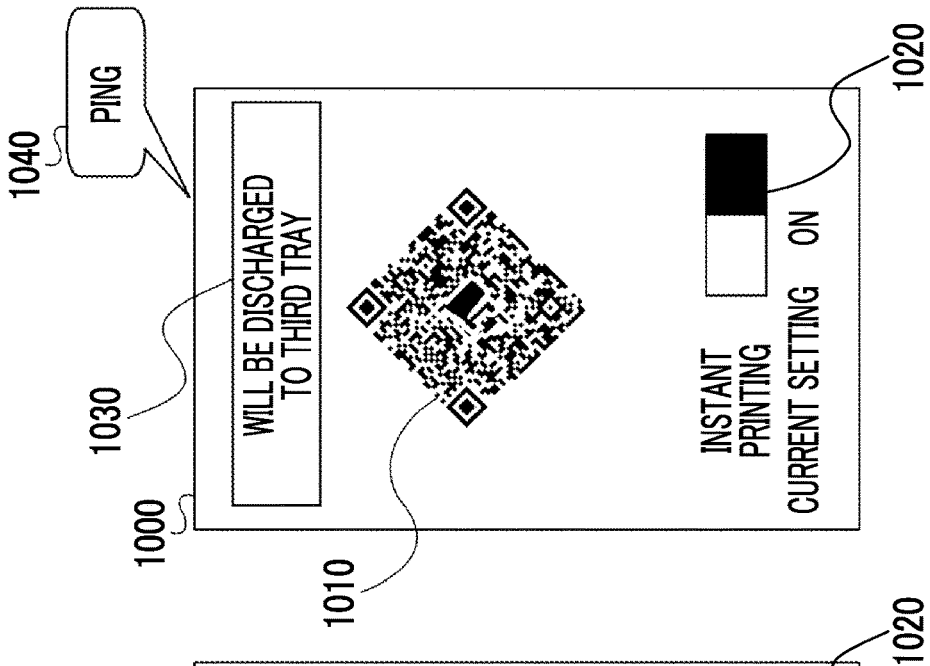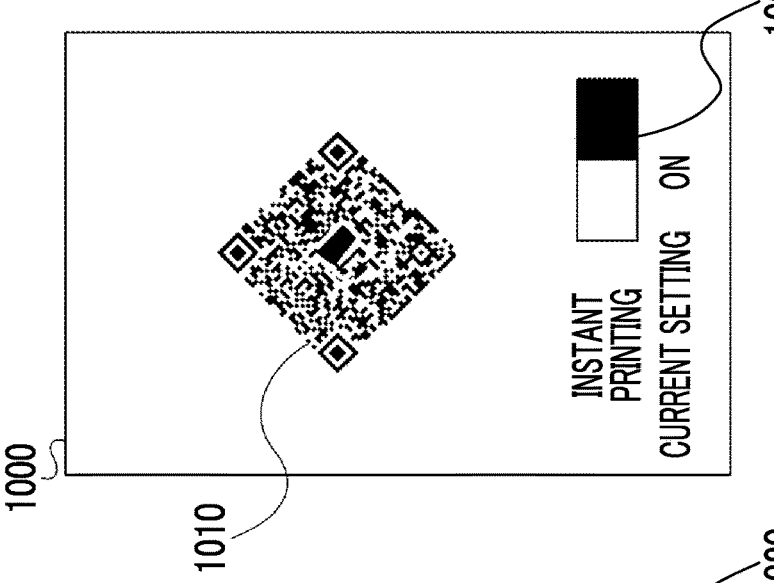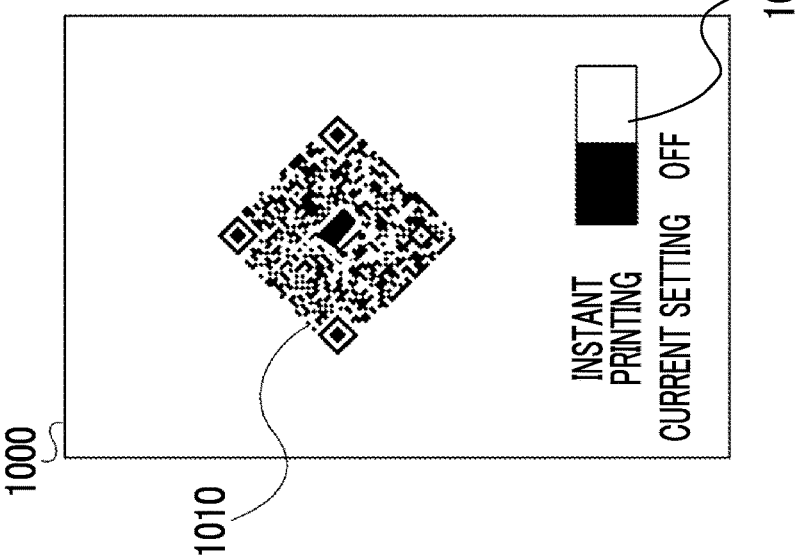

PORTABLE TERMINAL DEVICE, NON-TRANSITORY COMPUTER READABLE MEDIUM STORING PROGRAM, AND METHOD FOR PROVIDING SERVICE UPON AUTHENTICATED ENTRY

CROSS-REFERENCE TO RELATED APPLICATIONS

This application is based on and claims priority under 35 USC 119 from Japanese Patent Application No. 2022-048557 filed Mar. 24, 2022.

BACKGROUND

(i) Technical Field

The present disclosure relates to a portable terminal device, a non-transitory computer readable medium storing a program, and a method.

(ii) Related Art

JP2006-031545A discloses a system that omits authentication by linking camera information to a user at a time of purchasing a camera in order to register a photo captured by a digital camera via the Internet and print the photo in an image forming apparatus installed in a store.

JP2021-503108A discloses a system that detects approaching to a check-in terminal in an airport or the like using Bluetooth (registered trademark) or the like and starts an application related to self-service for a ticket.

SUMMARY

A user may enter a region in which authentication is necessary at a time of entry and receive a service in the region. In this case, in a case where the user selects the service after entering the region, a setting operation may require time, or time may be required until the service is provided.

Aspects of non-limiting embodiments of the present disclosure relate to a portable terminal device, a non-transitory computer readable medium storing a program, and a method that can eliminate need for performing an operation of selection setting related to a service provided in a region in a case where a user enters the region in which user authentication is necessary at a time of entry.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a portable terminal device including a processor configured to, in receiving a notification indicating that a user has entered a region in which authentication of the user is necessary at a time of entry, notify, in a case where a selection related to a service provided in the region is made in advance, a system providing the service of a content of the selection.

BRIEF DESCRIPTION OF THE DRAWINGS

Exemplary embodiment(s) of the present invention will be described in detail based on the following figures, wherein:

FIG. 10A is an example of an authentication and setting screen displayed on a display device of the portable terminal device and is a diagram illustrating a state where an instant printing setting is "OFF";

FIG. 10B is also an example of the authentication and setting screen and is a diagram illustrating a state where the instant printing setting is "ON";

FIG. 10C is also an example of the authentication and setting screen and is a diagram illustrating a state where a notification of discharge tray information is provided.

DETAILED DESCRIPTION

First Exemplary Embodiment

An image forming system 10 of a first exemplary embodiment of the present disclosure will be described with reference to the drawings. The following exemplary embodiments illustrate an image forming system according to an exemplary embodiment of the present disclosure and are not intended to limit the present disclosure to the following exemplary embodiments.

Figure 1:
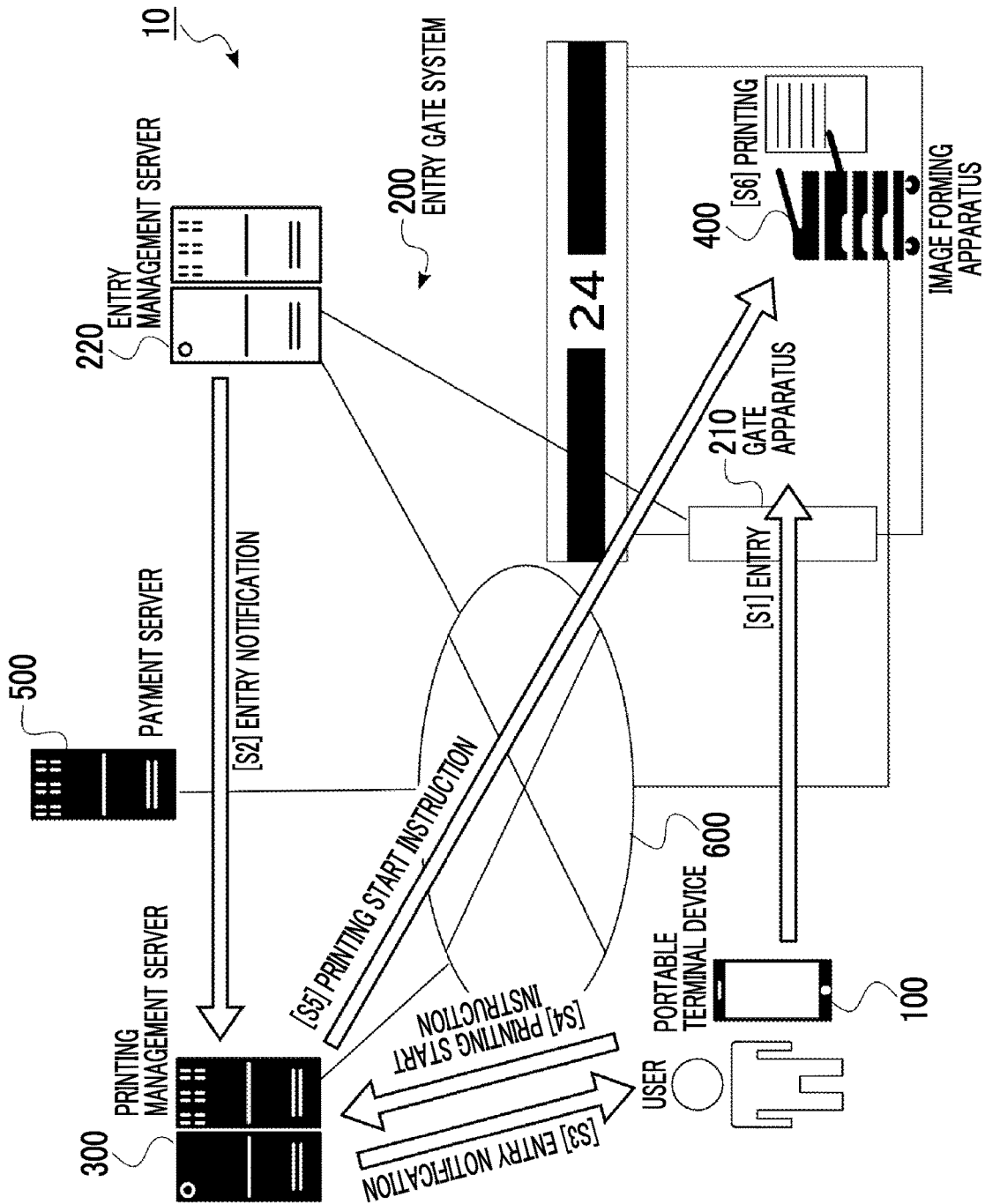
FIG. 1 is an overall concept diagram illustrating an example of an image forming system in a first exemplary embodiment of the present disclosure.

FIG. 1 is an overall concept diagram illustrating an example of the image forming system 10 of the first exemplary embodiment. As illustrated in FIG. 1, the image forming system 10 includes a portable terminal device 100 operated by a user, an entry gate system 200, a printing management server 300, an image forming apparatus 400, and a payment server 500. These constituents are connected to each other via a network such as an Internet 600 or the like.

While a detailed description will be provided later, a general flow of process in the image forming system 10 will be briefly described. First, the user registers image data as a printing target in the printing management server 300 using the portable terminal device 100 or a client terminal device, not illustrated. In the registration, user information and payment information are assumed to be associated with each other in the image data.

In step S1 in FIG. 1, the user passes through the entry gate system 200 to enter a store such as a 24-hour convenience store in which the image forming apparatus 400 is installed. In this case, the user displays an authentication image used for authenticating the entering user on a display device of the portable terminal device 100 carried by the user. At this point, an instant printing setting screen is displayed on the display device of the portable terminal device 100 in addition to the authentication image. Here, the user is assumed to have entered the store by causing an imaging device of the entry gate system 200 to read the authentication image in a state where instant printing is set to "ON" on the instant printing setting screen. Then, in step S2, an entry management server 220 specifies the user who has entered and transmits an entry notification to the printing management server 300. In step S3, the printing management server 300 specifies the portable terminal device 100 carried by the user and transmits the entry notification to the portable terminal device 100.

In a case where the entry notification is received, the portable terminal device 100 acquires a state of selection of a printing setting on the instant printing setting screen at the current point in time and transmits an instruction for the instant printing, that is, a printing start instruction, corresponding to the acquired state to the printing management server 300 in step S4. In a case where the printing start instruction is received, the printing management server 300 specifies the image data registered by the user and transmits the image data and a printing instruction to the image forming apparatus 400 in step S5. In step S6, the image forming apparatus 400 starts printing the received image data.

In a case of receiving a setting as to whether or not to instantly start printing by displaying the instant printing setting screen together with the authentication image displayed by the user for authentication at a time of entry, printing is started from the image forming apparatus 400 in the store at a timing of entry of the user to the store.

In the image forming system 10, a plurality of the portable terminal device 100 and a plurality of the image forming apparatus 400 may be present and each may be connected to the Internet 600. However, in the present exemplary embodiment, a case where only one portable terminal device 100 and only one image forming apparatus 400 are connected to the Internet 600 will be described for brief description.

Figure 2:
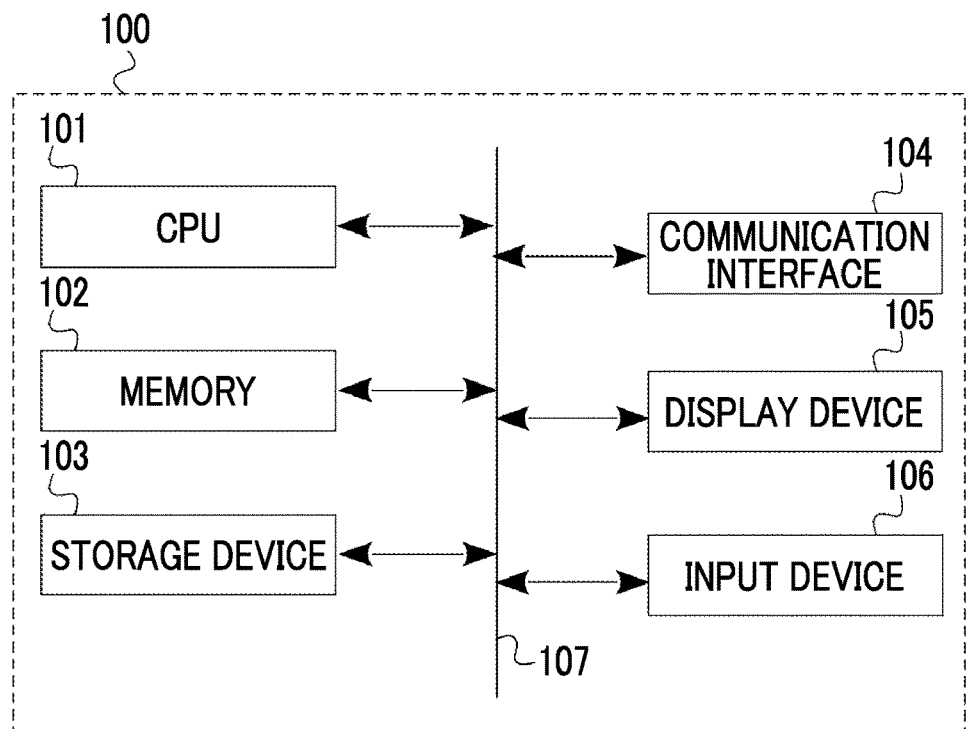
FIG. 2 is a hardware configuration diagram of a portable terminal device in an exemplary embodiment of the present disclosure.
Figure 3:
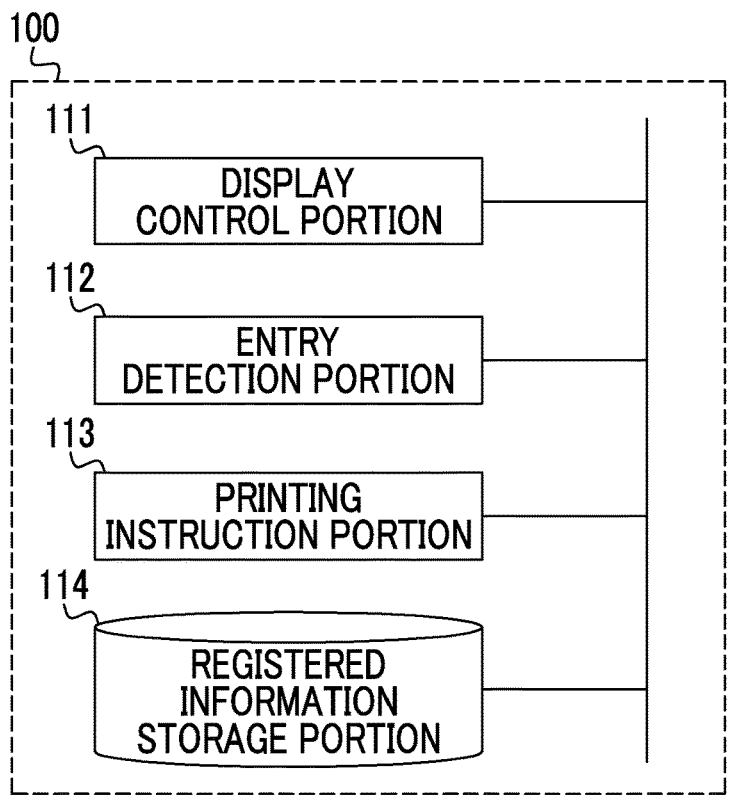
FIG. 3 is a function block diagram of the portable terminal device in the exemplary embodiment of the present disclosure.

The portable terminal device 100 will be described with reference to FIG. 2 and FIG. 3. The portable terminal device 100 is carried and operated by the user entering the store in which the image forming apparatus 400 is installed, and is a portable terminal device such as a tablet computer or a smartphone. FIG. 2 is a hardware configuration diagram of the portable terminal device 100, and FIG. 3 is a function block diagram of the portable terminal device 100. As illustrated in FIG. 2, the portable terminal device 100 includes a CPU 101, a memory 102, a storage device 103, a communication interface 104, a display device 105, and an input device 106, each of which is connected to a control bus 107.

The CPU 101 is a control microprocessor and controls an operation of each portion of the portable terminal device 100 based on a control program stored in the storage device 103.

The memory 102 temporarily stores an "ON"/"OFF" state of the instant printing setting, discharge tray information received from the printing management server 300, and the like, described later.

The storage device 103 is configured with a solid state drive (abbreviated to SSD) or a hard disk drive (abbreviated to HDD) and stores the control program for controlling each portion of the portable terminal device 100. In the present exemplary embodiment, while a form of installing the control program in the storage device 103 is described, the present disclosure is not limited thereto. The control program according to the present exemplary embodiment may be provided in the form of a recording on a computer readable storage medium. For example, the control program according to the present exemplary embodiment may be provided in the form of a recording on an optical disc such as a compact disc (CD)-ROM and a digital versatile disc (DVD)-ROM or in the form of a recording on a semiconductor memory such as a universal serial bus (USB) memory and a memory card. In addition, the control program according to the present exemplary embodiment may be acquired from an external apparatus via a communication line connected to the communication interface 104.

The communication interface 104 performs a communication control for communicating with the printing management server 300 connected via the Internet.

The display device 105 is configured with a display device such as a liquid crystal panel or an organic EL display and displays an image generated by a display control portion 111, described later.

For example, the input device 106 is configured with an electrostatic capacitive touch panel formed on a surface of the display device 105. The user performs an input operation by operating the input device 106 while visually recognizing a user interface image displayed on the display device 105.

In addition, as illustrated in FIG. 3, the portable terminal device 100 exhibits functions as the display control portion 111, an entry detection portion 112, a printing instruction portion 113, and a registered information storage portion 114 by executing the control program stored in the storage device 103.

The display control portion 111 displays the authentication image stored in the registered information storage portion 114 on the display device 105 together with a generated service setting selection screen in response to an instruction of the user. In addition, in a case where a notification of the discharge tray information is received from the image forming apparatus 400 via the printing management server 300, the display control portion 111 generates an image displaying the discharge tray information and displays the image on the display device 105.

The entry detection portion 112 determines whether or not the entry notification is received from the printing management server 300.

In a case where the entry detection portion 112 determines that the entry notification is received, the printing instruction portion 113 acquires the "ON"/"OFF" state of the instant printing setting set by the user by operating the service setting selection screen. In a case where the instant printing setting is in the "ON" state, the printing instruction portion 113 transmits the printing start instruction to the printing management server 300.

The user information including a user name and a user ID, the authentication image necessary for the user to enter the store, and information as to whether or not the image data as the printing target registered in the printing management server 300 by the user is present are registered in the registered information storage portion 114.

Next, the entry gate system 200 will be described. While detailed description is omitted, the entry gate system 200 is configured with a gate apparatus 210 including the imaging device and a communication device and the entry management server 220 as illustrated in FIG. 1. The gate apparatus 210 is installed at a boundary of a region such as a cashierless store in which the authentication of the user is necessary at the time of entry, and authenticates the user entering the region. The imaging device reads the authentication image displayed on the display device 105 of the portable terminal device 100 of the entering user and transmits read information to the entry management server 220 by the communication device. The entry management server 220 specifies who has entered based on the received information and transmits the entry notification to the printing management server 300. For example, the entry management server 220 specifies the user ID of the user who has entered and transmits the user ID to the printing management server 300. While the entry gate system 200 may not only specify the entering user but also specify an exiting user, this is omitted in the present exemplary embodiment.

Figure 4:
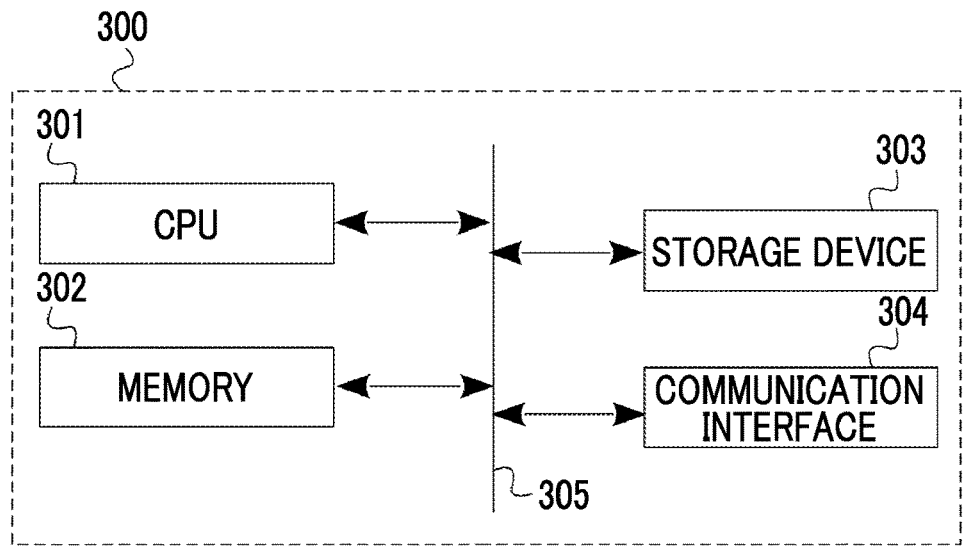
FIG. 4 is a hardware configuration diagram of a printing management server in the exemplary embodiment of the present disclosure.
Figure 5:
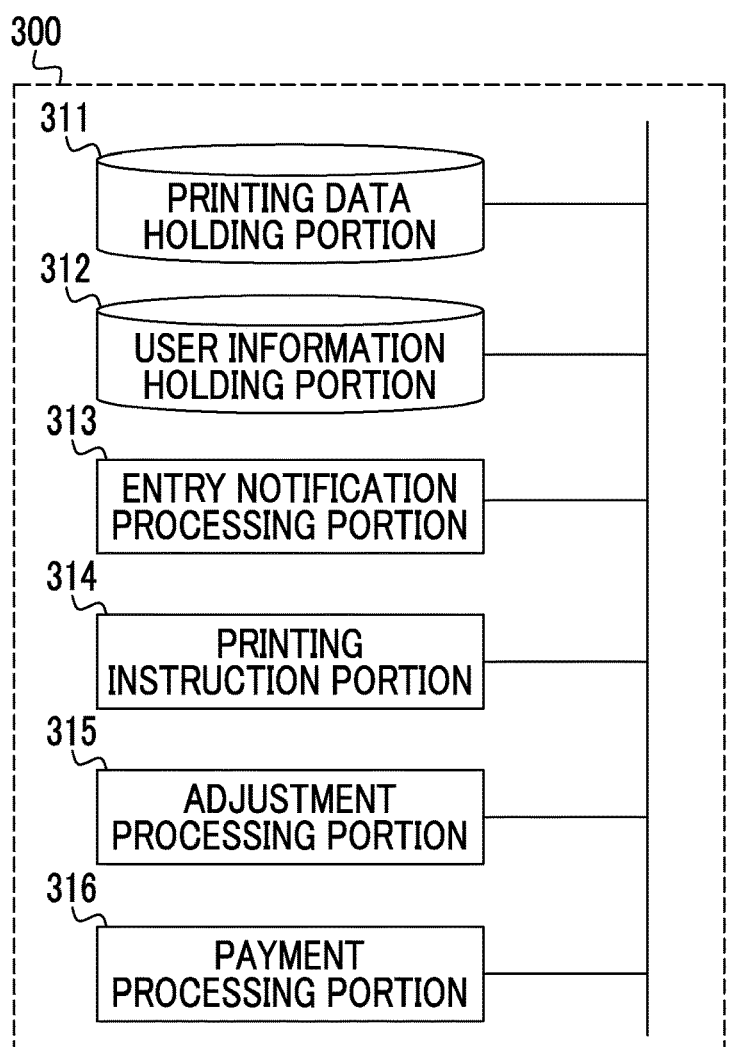
FIG. 5 is a function block diagram of the printing management server in the exemplary embodiment of the present disclosure.

Next, the printing management server 300 will be described with reference to FIG. 4 and FIG. 5. FIG. 4 is a hardware configuration diagram of the printing management server 300, and FIG. 5 is a function block diagram of the printing management server 300. As illustrated in FIG. 4, the printing management server 300 includes a CPU 301, a memory 302, a storage device 303, and a communication interface 304, each of which is connected to a control bus 305.

The CPU 301 is a control microprocessor and controls an operation of each portion of the printing management server 300 based on a control program stored in the storage device 303.

The memory 302 temporarily stores information about the user received from the entry management server 220, information about the printing instruction received from the portable terminal device 100, and the like.

The storage device 303 is configured with a hard disk drive (abbreviated to HDD) or a solid state drive (abbreviated to SSD) and stores the control program for controlling each portion of the printing management server 300. In the present exemplary embodiment, while a form of installing the control program in the storage device 303 is described, the present disclosure is not limited thereto. The control program according to the present exemplary embodiment may be provided in the form of a recording on a computer readable storage medium. For example, the control program according to the present exemplary embodiment may be provided in the form of a recording on an optical disc such as a compact disc (CD)-ROM and a digital versatile disc (DVD)-ROM or in the form of a recording on a semiconductor memory such as a universal serial bus (USB) memory and a memory card. In addition, the control program according to the present exemplary embodiment may be acquired from an external apparatus via a communication line connected to the communication interface 304. In addition, the storage device 303 stores printing data and the user information, described later.

The communication interface 304 performs a communication control for communicating with the portable terminal device 100, the entry gate system 200, the image forming apparatus 400, and the payment server 500 connected via the Internet.

In addition, as illustrated in FIG. 5, the printing management server 300 exhibits each function below by executing the control program stored in the storage device 303.

A printing data holding portion 311 holds the image data as the printing target registered in advance by the user in association with the user ID. Here, the "image data" is printing target data that is created by the portable terminal device 100 or the client terminal device, not illustrated, or acquired by these devices via a network such as the Internet 600, and can be used to form an image. The printing target data includes image file data in a raster form or a vector form, text file data, and PDL file data in which the image data and text data are described in a page description language form that can be used to form an image.

In addition, the image data is assumed to be stored in advance in association with the printing setting provided by an instruction of the user. The printing setting includes the number of copies for printing the image data, a setting of duplex/simplex printing, an output paper sheet size, and a selection of color/greyscale.

A user information holding portion 312 stores the user information. Specifically, the user information holding portion 312 stores the user name, the user ID, a terminal identification ID of the portable terminal device 100 of each user or an identification ID of an application installed on the portable terminal device 100, and credit card information in association with each other.

An entry notification processing portion 313 receives the user ID of the user who has entered from the entry gate system 200. In a case where the user ID is received, the entry notification processing portion 313 specifies the terminal identification ID or the identification ID of the application held in the user information holding portion 312 and transmits the entry notification to the portable terminal device 100. The entry notification may use a method of push notification transmission to the portable terminal device 100.

In a case where the printing start instruction is received from the portable terminal device 100, the printing instruction portion 314 specifies the image data stored in the printing data holding portion 311 in association with the user ID of the user. In addition, the printing instruction portion 314 instructs the image forming apparatus 400 to perform printing by transmitting the specified image data to the image forming apparatus 400.

In a case where a printing unavailable notification indicating that printing cannot be performed is received from the image forming apparatus 400, an adjustment processing portion 315 causes the portable terminal device 100 of the user to make an inquiry as to whether to cancel or wait for printing. In a case where a printing cancelation instruction is received, the image forming apparatus 400 is instructed to stop printing the image data of the user. On the other hand, in a case where a printing waiting instruction is received, the adjustment processing portion 315 transmits an instruction to continue printing to the image forming apparatus 400.

In a case where a notification indicating that printing is finished is received from the image forming apparatus 400, a payment processing portion 316 performs a charging process by transmitting the credit card information and a payment amount to the payment server 500 based on the credit card information registered in the user information holding portion 312.

Figure 6:
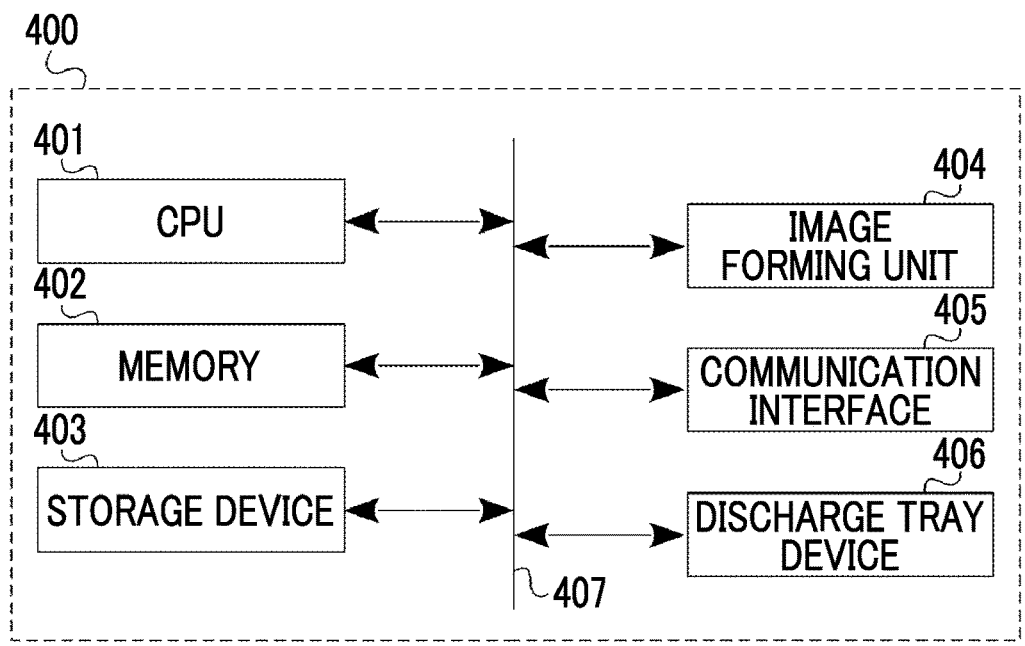
FIG. 6 is a hardware configuration diagram of an image forming apparatus in the exemplary embodiment of the present disclosure.
Figure 7:
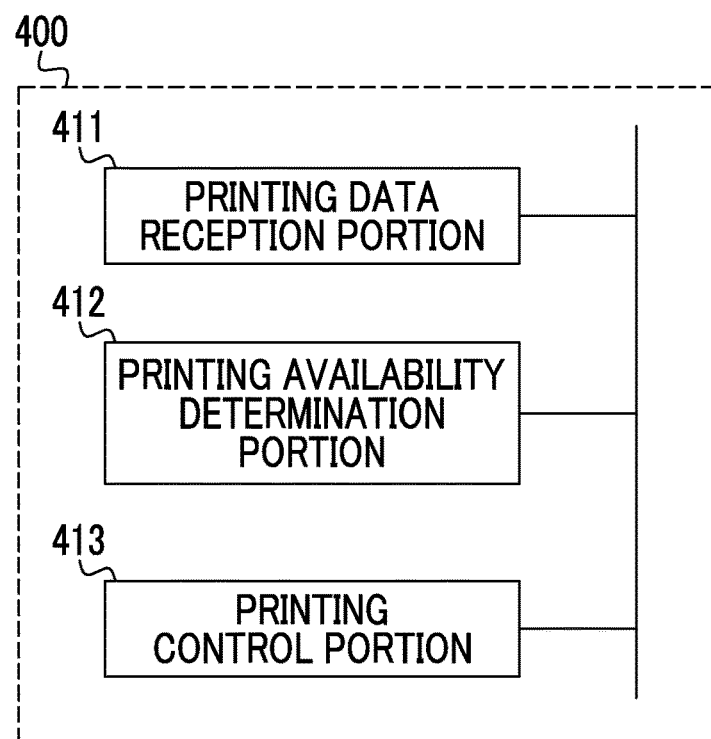
FIG. 7 is a function block diagram of the image forming apparatus in the exemplary embodiment of the present disclosure.

Next, the image forming apparatus 400 will be described with reference to FIG. 6 and FIG. 7. FIG. 6 is a hardware configuration diagram of the image forming apparatus 400, and FIG. 7 is a function block diagram of the image forming apparatus 400. As illustrated in FIG. 6, the image forming apparatus 400 includes a CPU 401, a memory 402, a storage device 403, an image forming unit 404, a communication interface 405, and a discharge tray device 406, each of which is connected to a control bus 407.

The CPU 401 is a control microprocessor and controls an operation of each portion of the image forming apparatus 400 based on a control program stored in the storage device 403.

The memory 402 temporarily stores the printing data printed by the image forming unit 404 of the image forming apparatus 400.

The storage device 403 is configured with a hard disk drive (abbreviated to HDD) or a solid state drive (abbreviated to SSD) and stores the control program for controlling each portion of the image forming apparatus 400. In the present exemplary embodiment, while a form of installing the control program of the image forming apparatus 400 in the storage device 403 is described, the present disclosure is not limited thereto. The control program according to the present exemplary embodiment may be provided in the form of a recording on a computer readable storage medium. For example, the control program according to the present exemplary embodiment may be provided in the form of a recording on an optical disc such as a compact disc (CD)-ROM and a digital versatile disc (DVD)-ROM or in the form of a recording on a semiconductor memory such as a universal serial bus (USB) memory and a memory card. In addition, the control program according to the present exemplary embodiment may be acquired from an external apparatus via a communication line connected to the communication interface 405.

The image forming unit 404 prints the image data received from the printing management server 300 on a recording medium or the like such as paper by performing a printing process in accordance with the printing setting also received from the printing management server 300.

The communication interface 405 performs a communication control for communicating with the printing management server 300 connected via the Internet 600, through a LAN cable, not illustrated, or via a wireless LAN.

The discharge tray device 406 is configured with a plurality of discharge trays, discharges a printed matter to a different discharge tray for each user, and temporarily stores the printed matter until the user takes the printed matter from the discharge tray.

In addition, as illustrated in FIG. 7, the image forming apparatus 400 exhibits each function of a printing data reception portion 411, a printing availability determination portion 412, and a printing control portion 413 by executing the control program stored in the storage device 403.

The printing data reception portion 411 receives the image data and the printing start instruction from the printing management server 300, converts the image data into a printable data form, and temporarily stores the converted image data in the memory 402.

The printing availability determination portion 412 monitors a state of the discharge tray device 406 and determines whether or not there is a vacant discharge tray as a discharge destination of the printed matter. In a case where there is a vacant discharge tray, the printing availability determination portion 412 decides to which discharge tray the printed matter is discharged. In addition, the printing availability determination portion 412 monitors whether or not a state where printing cannot be performed because of insufficient consumables is set, and whether or not another apparatus malfunction such as a paper jam occurs. In a case where printing is unavailable, the printing availability determination portion 412 transmits a notification indicating that printing is unavailable to the printing management server 300.

In a case where the printing availability determination portion 412 determines that printing is available, the printing control portion 413 prints the image data that is converted into a printable form and temporarily stored in the memory 402 on the recording medium such as paper by controlling the image forming unit 404 in accordance with the printing setting.

The payment server 500 performs the charging process in accordance with the credit card information and the payment amount received from the printing management server 300.

Figure 8:
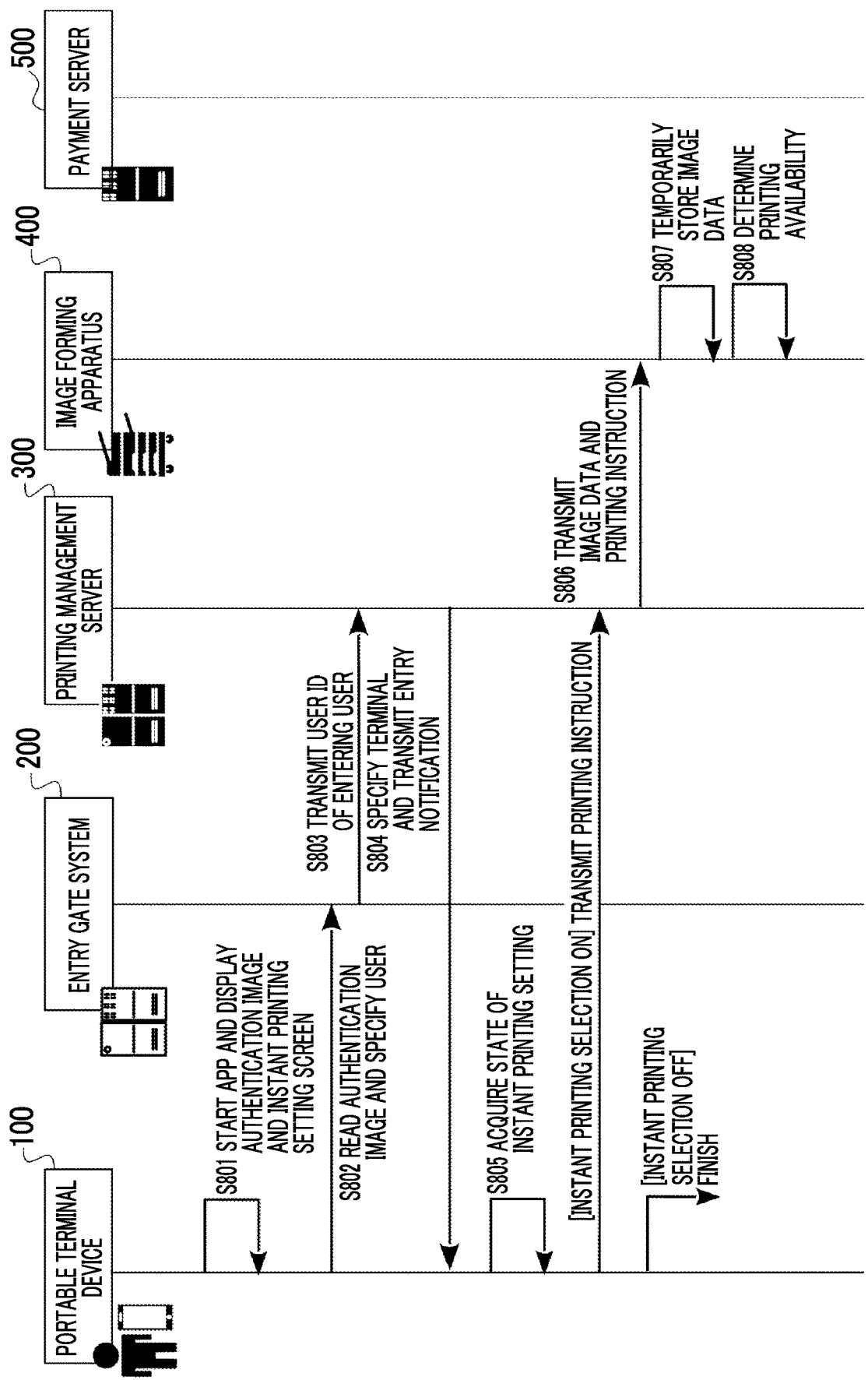
FIG. 8 is a sequence diagram illustrating a first half part of a process among apparatuses each constituting the image forming system in the exemplary embodiment of the present disclosure in time series.
Figure 9:
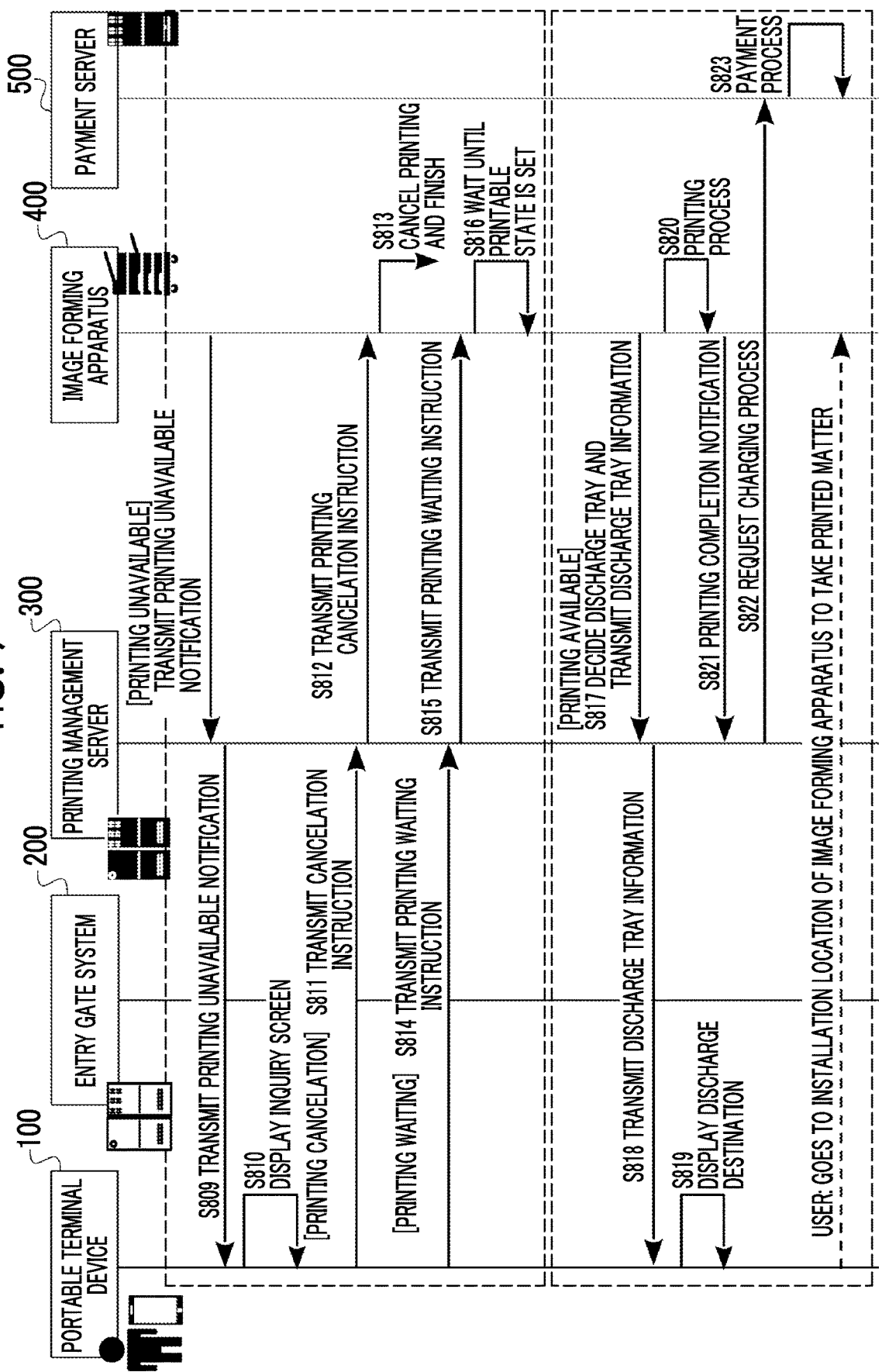
FIG. 9 is a sequence diagram illustrating a second half part of the process among the apparatuses each constituting the image forming system in the exemplary embodiment of the present disclosure in time series.

Next, a flow of overall process of the image forming system 10 will be described with reference to FIG. 8 and FIG. 9. FIG. 8 illustrates a first half part of a sequence diagram illustrating a process between each apparatus constituting the image forming system 10 in time series, and FIG. 9 illustrates a second half part following FIG. 8.

First, the user registers the image data as the printing target in the printing management server 300 using the portable terminal device 100 or the client terminal device, not illustrated. In the registration, the image data is assumed to be associated with the user ID.

In step S801, the user starts application software for entry authentication by operating the portable terminal device 100. In a case where the application software for entry authentication is started, the display control portion 111 displays an authentication and setting screen 1000 illustrated in FIG. 10A on the display device 105 in response to an instruction of the user in entering the store.

FIG. 10A is a diagram illustrating an example of the authentication and setting screen 1000 displayed on the display device 105 of the portable terminal device 100. As illustrated in FIG. 10A, the authentication and setting screen 1000 includes the authentication image used for authenticating the user entering the store and a setting image for receiving a selection related to a service provided in the region. For example, the authentication image is an image such as a two-dimensional code image 1010 obtained by coding the user information. For example, the setting image is an instant printing selection button 1020. An image for user identification stored in the registered information storage portion 114 is used as the two-dimensional code image 1010. Alternatively, the two-dimensional code image 1010 may be generated by the display control portion 111 based on the user name and the user ID stored in the registered information storage portion 114.

The instant printing selection button 1020 is displayed in a toggle button form and can be simply selected to "ON"/"OFF" by the user. A case where the instant printing selection button 1020 is set to "ON" means that the user provides an instruction to start printing the image of the registered image data immediately after entering the store. A case of "OFF" means that the instruction is not provided. The instant printing selection button 1020 is set to the "OFF" state when the application is started. In addition, besides the illustrated toggle button form, the instant printing selection button 1020 may be in any of a display form of checking a checkbox, a form of selecting one of a plurality of radio buttons, or a display form of displaying a pull-down menu and making a selection.

In step S802, the user enters the store by holding the display device 105 of the portable terminal device 100 to the imaging device of the gate apparatus 210 of the entry gate system 200. Then, the imaging device of the gate apparatus 210 reads the two-dimensional code image 1010 displayed on the display device 105 and makes an inquiry to the entry management server 220 using information included in the two-dimensional code image 1010. The entry management server 220 specifies who the user who has entered is, for example, the user ID of the user who has entered.

In step S803, the entry management server 220 of the entry gate system 200 transmits the user ID of the user who has entered to the printing management server 300.

In step S804, in a case where the user ID is received, the entry notification processing portion 313 of the printing management server 300 specifies the terminal identification ID or the identification ID of the application that corresponds to the user ID and is held in the user information holding portion 312. The entry notification is transmitted to the portable terminal device 100 having the terminal identification ID or the identification ID of the application. For example, the entry notification is provided using the method of push notification transmission to the portable terminal device 100.

In a case where the entry detection portion 112 of the portable terminal device 100 determines that the entry notification is received, the printing instruction portion 113 acquires the "ON"/"OFF" state of the instant printing selection button 1020 of the authentication and setting screen 1000 in step S805. For example, in a case where the instant printing selection button 1020 is set to the "ON" state as illustrated in FIG. 10B, the printing instruction portion 113 transmits the printing start instruction to the printing management server 300 together with the user ID. On the other hand, as illustrated in FIG. 10A, in a case where the instant printing selection button is in the "OFF" state, the printing instruction portion 113 does not transmit the printing start instruction.

In step S806, in a case where the printing instruction portion 314 of the printing management server 300 receives the user ID and the printing start instruction, the image data registered in the printing data holding portion 311 is specified using the user ID. Furthermore, the printing instruction portion 314 transmits the image data to the image forming apparatus 400 together with the printing start instruction.

In step S807, the printing data reception portion 411 of the image forming apparatus 400 receives the printing start instruction and the image data, converts the image data into a printable data form, and temporarily stores the converted image data in the memory 402.

In step S808, the printing availability determination portion 412 determines whether or not there is a vacant discharge tray, whether or not consumables are insufficient, and whether or not another apparatus malfunction such as a paper jam occurs. In a case where a determination that printing is unavailable is made, the printing availability determination portion 412 transmits the notification indicating that printing is unavailable to the printing management server 300. In a case where a determination that printing is unavailable is made, the following process of step S809 to step S816 corresponding to an upper part surrounded by a dotted line in FIG. 9 is performed. On the other hand, in a case where a determination that printing is available is made, a process of step S817 to step S823, described later, corresponding to a lower part surrounded by a dotted line in FIG. 9 is performed.

In a case where the notification indicating that printing is unavailable is received from the image forming apparatus 400, the adjustment processing portion 315 of the printing management server 300 transmits the notification indicating that printing is unavailable to the portable terminal device 100 in step S809.

In a case where the notification indicating that printing is unavailable is received, the display control portion 111 of the portable terminal device 100 generates an inquiry screen on which a selection as to whether to stop or wait for printing is received, and displays the inquiry screen on the display device 105 in step S810. In a case where the user selects cancelation, the printing instruction portion 113 transmits the printing cancelation instruction to the printing management server 300 in step S811. In a case where the printing cancelation instruction is received, the adjustment processing portion 315 of the printing management server 300 transmits the printing cancelation instruction to the image forming apparatus 400 in step S812. In a case where the printing cancelation instruction is received, the printing data reception portion 411 of the image forming apparatus 400 deletes the image data temporarily stored in the memory 402 and finishes the printing process in step S813.

In a case where the user operates the display device 105 of the portable terminal device 100 to select waiting for printing on the inquiry screen in step S810, the printing instruction portion 113 transmits the printing waiting instruction to the printing management server 300 in step S814. In a case where the printing waiting instruction is received, the adjustment processing portion 315 of the printing management server 300 transmits the printing waiting instruction to the image forming apparatus 400 in step S815. In a case where the printing waiting instruction is received, the image forming apparatus 400 determines whether or not a state where the printing process can be performed is set using the printing availability determination portion 412 and waits for the process until a state where the printing process can be performed is set in step S816.

In a case where a determination that printing is available is made in step S808, or in a case where a state where the printing process is available is set in step S816, the printing availability determination portion 412 decides a discharge tray to discharge the printed matter in step S817. The printing availability determination portion 412 transmits the discharge tray information to the printing management server 300.

In step S818, the printing instruction portion 314 of the printing management server 300 transmits the discharge tray information that is received from the image forming apparatus 400 and is information related to the discharge destination, to the portable terminal device 100.

In step S819, the display control portion 111 of the portable terminal device 100 generates a pop-up image for displaying the received discharge tray information that is information related to the discharge destination, and displays the pop-up image on the display device 105. Specifically, a notification message 1030 such as "Will be discharged to third tray" is displayed as illustrated in FIG. 10C. In addition, the notification may be highlighted by a sound effect such as a chime sound 1040 so that the user easily notices the notification, or a notification of the discharge tray information may be provided by voice.

In step S820, the printing control portion 413 of the image forming apparatus 400 prints the image data in a printable state stored in the memory using the image forming unit 404 and discharges the printed matter to the discharge tray decided in step S817.

In a case where printing is completed, the printing control portion 413 of the image forming apparatus 400 transmits a printing completion notification to the printing management server 300 in step S821. In step S822, the payment processing portion 316 of the printing management server 300 requests the charging process by transmitting the credit card information and the payment amount to the payment server 500 based on the credit card information registered in the user information holding portion 312.

In step S823, the payment server 500 performs a payment process based on the received credit card information and payment amount.

Lastly, the user who has entered the store moves to an installation location of the image forming apparatus 400, takes the printed matter from the discharge tray in which the printed matter is placed by referring to the discharge tray information already notified to the portable terminal device 100, and finishes the process. The user does not need to operate the image forming apparatus 400 until taking the printed matter.

Second Exemplary Embodiment

In the first exemplary embodiment, a case where the entry gate system 200 notifies the printing management server 300 of only the user ID of the user who has entered and the printing management server 300 acquires the state of the instant printing selection button of the portable terminal device 100 is described. That is, in the first exemplary embodiment, the entry gate system 200 does not substantially communicate with the portable terminal device 100, and the printing management server 300 communicates with the portable terminal device 100. However, the present disclosure is not limited to the first exemplary embodiment. In the following second exemplary embodiment, a case where a cashierless payment system 200A communicates with the portable terminal device 100, acquires the entry notification and the setting state of the instant printing selection button, and provides the printing start instruction will be described.

Figure 11:
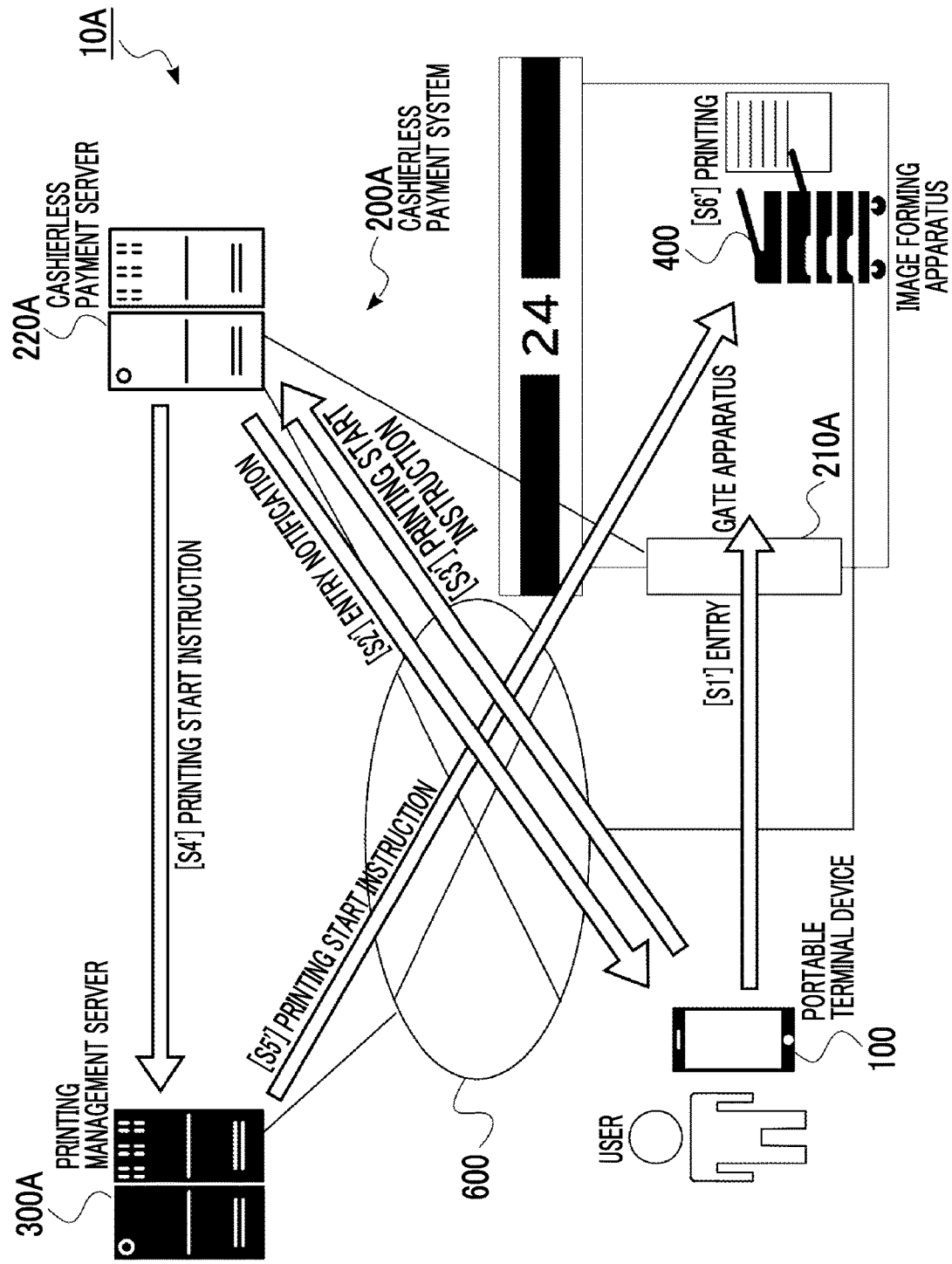
FIG. 11 is an overall concept diagram illustrating an example of an image forming system in a second exemplary embodiment of the present disclosure.

FIG. 11 is an overall concept diagram illustrating an example of an image forming system 10A of the second exemplary embodiment. As illustrated in FIG. 11, the image forming system 10A is configured with the portable terminal device 100, the cashierless payment system 200A, a printing management server 300A, and the image forming apparatus 400. Each constituent of the image forming system 10A of the second exemplary embodiment is approximately identical except the cashierless payment system 200A and the printing management server 300A and thus, will not be described in detail. Identical constituents will be described with identical reference numerals. The payment server 500 of the first exemplary embodiment is assumed to be integrated in the cashierless payment system 200A in the second exemplary embodiment.

In step S1', the user enters by holding the same authentication and setting screen 1000 as in FIG. 10A on the display device 105 of the portable terminal device 100 to the imaging device of the gate apparatus 210A of the cashierless payment system 200A of the store. Then, the imaging device of the gate apparatus 210A reads the two-dimensional code image 1010 displayed on the display device 105 and makes an inquiry as to who the user who has entered is to a cashierless payment server 220A using the information included in the two-dimensional code image 1010. In specifying who the user who has entered is, the cashierless payment server 220A specifies the terminal identification ID of the portable terminal device 100 of the user or the identification ID of the application. The cashierless payment server 220A is assumed to store the terminal identification ID of the portable terminal device 100 of the user carried by the user or the identification ID of the application in association with the user name and the user ID.

Next, in step S2', the cashierless payment server 220A transmits the entry notification to the portable terminal device 100 carried by the user using the specified terminal identification ID or identification ID of the application. In a case where the entry notification is received, the portable terminal device 100 acquires the "ON"/"OFF" state of the instant printing selection button 1020 of the authentication and setting screen 1000. In a case where the instant printing selection button 1020 is set to the "ON" state, the printing instruction portion 113 transmits the printing start instruction to the cashierless payment server 220A together with the user ID in step S3'.

In a case where the printing start instruction is received, the cashierless payment server 220A transmits the printing start instruction and the user ID to the printing management server 300 in step S4'. In a case where the printing start instruction is received, the printing management server 300 specifies the image data to be printed based on the user ID and transmits the image data to the image forming apparatus 400 together with the printing start instruction in step S5'. The image forming apparatus 400 performs the printing process in step S6'.

In a case where printing is finished, the image forming apparatus 400 transmits a printing finish notification to the printing management server 300. The printing management server 300 requests the charging process by transmitting a payment process request to the cashierless payment server 220A. The cashierless payment server 220A performs the charging process based on the user information and the payment process request and finishes the process.

In the second exemplary embodiment, an example of transmitting the printing start instruction to the printing management server 300 via the cashierless payment server 220A in a case where the instant printing selection button 1020 of the authentication and setting screen 1000 of the portable terminal device 100 is "ON" is described. However, the present disclosure is not limited to the exemplary embodiment. The printing start instruction may be directly transmitted to the printing management server 300 from the portable terminal device 100.

In each of the exemplary embodiments, a case where the portable terminal device 100 transmits the printing start instruction in a case where the instant printing selection button is "ON" is described. That is, the portable terminal device 100 transmits a service provision instruction such as the printing start instruction corresponding to a content of selection in accordance with the state of the instant printing selection button. However, the present disclosure is not limited thereto. The printing management server 300 or the cashierless payment server 220A may be notified of the state of selection of "ON"/"OFF" of the instant printing selection button, and the printing management server 300 or the cashierless payment server 220A may transmit the printing start instruction in a case where the selection of the button is in the "ON" state.

While the selection for the printing instruction described above is a binary selection between "ON" and "OFF" indicating whether or not to perform the instant printing, the present disclosure is not limited thereto. One or a plurality may be selected or excluded from a plurality of options, for example, three options.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

In the exemplary embodiments, an example of applying the present disclosure to a printing service for printing printing data registered in advance by a user using the image forming apparatus 400 installed in a region in which authentication of the user is necessary at a time of entry to a cashierless store or the like is described. In addition, a selection related to the printing service set by the user using the portable terminal device 100 is a selection of "ON"/ "OFF" as to a timing of performing printing, that is, whether or not to perform the instant printing of starting printing at the same time as the entry of the user to the region. However, the present disclosure is not limited thereto. For example, a setting for starting printing at a preset timing after entry may be selected so that the user takes the printed matter after arriving at the image forming apparatus 400.

In various systems or services for entering a store or making a payment by holding an authentication image such as a two-dimensional code to any device, the authentication image may be displayed, and "ON"/"OFF" of a service selection may be switched to be selected. A service corresponding to the selection may be received after entry to the store or at a time of payment. In a case where a user enters a region such as a cashierless payment store, a train facility, or other service facilities in which a service is received by registering as a member and authentication of the user is necessary at a time of entry, the portable terminal device 100 receives a notification indicating entry. In this case, a selection related to the service provided in the region is received in advance. In a case where the notification of entry is received, a system providing the service is notified of a content of the selection.

For example, in a case where an "ON"/"OFF" setting of a "designated seat" or "paid seat" option can be set on a boarding ticket of a train and entry to a station or boarding a vehicle is performed by setting the designated seat option to "ON", designated seat information may be issued, and the user may use a designated seat. In addition, in a case where an "ON"/"OFF" setting of a "massage and hot stone spa" can be set on an entry code and entry to a day spa facility is made by setting the option to "ON", the service may be provided. In addition, in a case of making a payment at a storefront by holding a display device of a portable terminal, an "ON"/"OFF" setting of an option of donating by rounding up change in accordance with a predetermined method may be performed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A portable terminal device comprising:
a display device; and
a processor configured to:
in receiving a notification indicating that a user has entered a region in which authentication of the user is necessary at a time of entry, notify, in a case where a selection related to a service provided in the region is made in advance, a system providing the service of a content of the selection,
wherein the processor is configured to:
in performing the authentication by displaying an authentication image used for authenticating the user on the display device, acquire a state of the selection that is related to the service provided in the region and is made in advance by the user.

2. The portable terminal device according to claim 1,
wherein the processor is configured to:
display, in response to an instruction of the user in entering the region, the authentication image used for authenticating the user and a setting image for receiving the selection related to the service provided in the region on the display device.

3. The portable terminal device according to claim 2,
wherein the service is a printing service for printing printing data registered in the system providing the service in advance by the user using an image forming apparatus installed in the region, and the selection related to the printing service is a selection for a timing of performing printing.

4. The portable terminal device according to claim 3,
wherein the selection related to the printing service is a selection as to whether or not to start printing at the same time as the entry of the user to the region.

5. The portable terminal device according to claim 4,
wherein the processor is configured to:
receive information related to a discharge destination to which a printed matter on which the printing data is printed is discharged, and notify the information.

6. The portable terminal device according to claim 4,
wherein the processor is configured to:
in a case where printing of the printing data by the image forming apparatus is unavailable, receive a selection as to whether to stop or wait for printing.

7. The portable terminal device according to claim 2,
wherein the processor is configured to:
in notifying the system providing the service of the content of the selection, provide an instruction to provide the service in accordance with the content of the selection.

8. The portable terminal device according to claim 1,
wherein the service is a printing service for printing printing data registered in the system providing the service in advance by the user using an image forming apparatus installed in the region, and the selection related to the printing service is a selection for a timing of performing printing.

9. The portable terminal device according to claim 8,
wherein the selection related to the printing service is a selection as to whether or not to start printing at the same time as the entry of the user to the region.

10. The portable terminal device according to claim 9,
wherein the processor is configured to:
receive information related to a discharge destination to which a printed matter on which the printing data is printed is discharged, and notify the information.

11. The portable terminal device according to claim 9, wherein the processor is configured to:

in a case where printing of the printing data by the image forming apparatus is unavailable, receive a selection as to whether to stop or wait for printing.

12. The portable terminal device according to claim 1, wherein the processor is configured to:

in notifying the system providing the service of the content of the selection, provide an instruction to provide the service in accordance with the content of the selection.

13. A non-transitory computer readable medium storing a program causing a computer constituting a portable terminal device to perform a control comprising:

notifying, in receiving a notification indicating that a user has entered a region in which authentication of the user is necessary at a time of entry, in a case where a selection related to a service provided in the region is made in advance, a system providing the service of a content of the selection, wherein in performing the authentication by displaying an authentication image used for authenticating the user on a display device, a state of the selection that is related to the service provided in the region and is made in advance by the user is acquired.

14. A method comprising:

notifying, in receiving a notification indicating that a user has entered a region in which authentication of the user is necessary at a time of entry, in a case where a selection related to a service provided in the region is made in advance, a system providing the service of a content of the selection, wherein in performing the authentication by displaying an authentication image used for authenticating the user on a display device, a state of the selection that is related to the service provided in the region and is made in advance by the user is acquired.

* * * * *